June 9, 1925.

V. J. HENDRICKS

LOCK VALVE

Filed May 17, 1924

1,541,216

2 Sheets-Sheet 2

Inventor
Virgil J. Hendricks

Patented June 9, 1925.

1,541,216

UNITED STATES PATENT OFFICE.

VIRGIL J. HENDRICKS, OF MINNEAPOLIS, KANSAS, ASSIGNOR TO GEORGE E. HENDRICKS, OF SALINA, KANSAS.

LOCK VALVE.

Application filed May 17, 1924. Serial No. 714,053.

*To all whom it may concern:*

Be it known that I, VIRGIL J. HENDRICKS, a citizen of the United States, residing at Minneapolis, in the county of Ottawa and State of Kansas, have invented certain new and useful Improvements in a Lock Valve, of which the following is a specification.

This invention relates to valves for liquids and gases, whereby tampering with the valve by unauthorized persons is substantially eliminated.

An important object of this invention is to provide a valve of the above character wherein all of the locking mechanism is concealed within the valve casing.

Another object of this invention is to provide a valve of the above character which, when in a locked position, will allow the valve operating mechanism to be freely turned without injury to the valve or the locking mechanism.

A further object of this invention is to provide a valve of the above character in which the lock mechanism and surrounding parts may be detached and replaced when they become worn.

Other objects and advantages of the invention will be apparent during the course of the following description.

Figure 1:
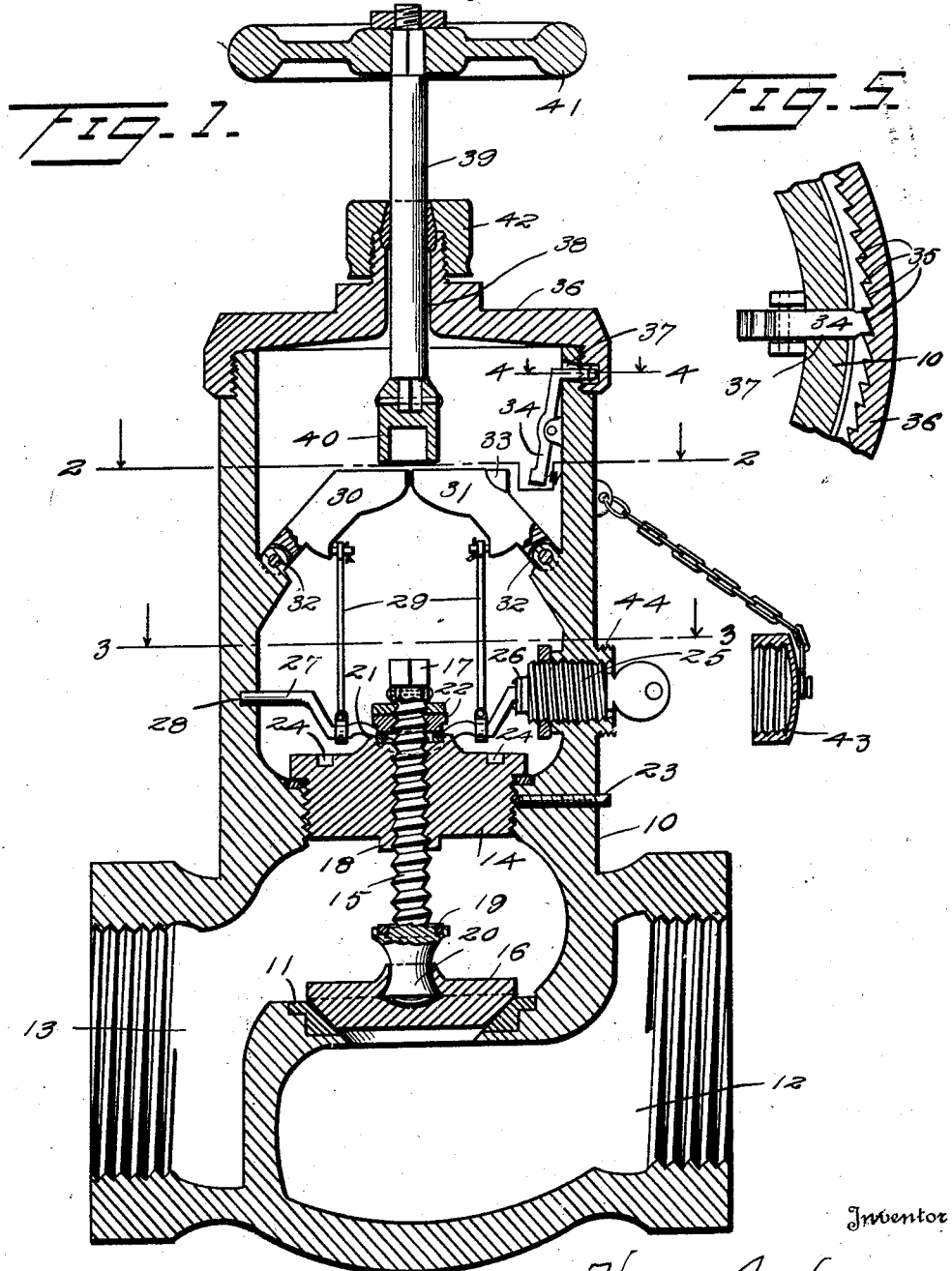
Figure 2:
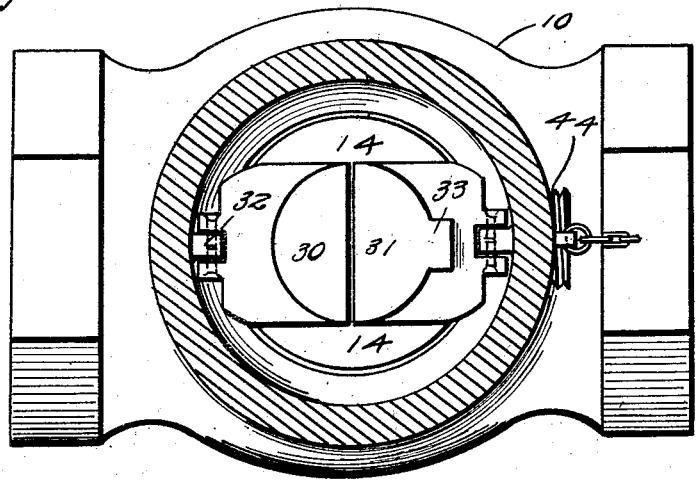
Figure 3:
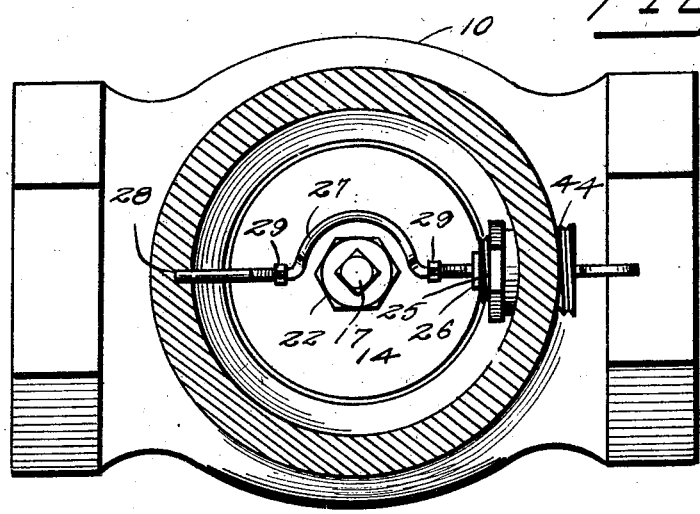

In the accompanying drawings, forming a part of this specification, and in which like numerals are employed to designate like parts throughout the same, Figure 1 is a vertical sectional view through a valve constructed in accordance with my invention, Figure 2 is a horizontal sectional view taken substantially on line 2—2 of Figure 1, Figure 3 is a horizontal sectional view taken substantially on line 3—3 of Figure 1, Figure 4 is a fragmentary view partly in section and partly in elevation, illustrating a lock cylinder and lock cylinder connecting rod, and, Figure 5 is a horizontal sectional view taken substantially on line 4—4 of Figure 1.

In the drawings, wherein for the purpose of illustration is shown a preferred embodiment of my invention, the numeral 10 designates a valve casing having a valve seat 11 and the usual inlet and outlet ports 12 and 13 respectively.

The valve casing has a detachable partition member 14 in which is screw threadably mounted a valve stem 15 carrying a swiveled head 16 at one end and a rectangular or other shaped head 17 at the other end thereof.

The detachable partition member 14 has a depending shoulder 18 engaging with a packing gland 19 on the upper face of the valve swivel 20 and a packing gland 21 mounted in its upper face engaging with washers 22 carried by the valve stem 15 to provide leak-proof joints when the valve 16 is in opened or closed position.

The detachable partition member 14 is held against movement by means of a locking pin 23. By releasing the pin 23 and applying a wrench or other implement to the partition member through the medium of the depressions 24 the same may be removed.

Mounted in the valve casing 10 above the partition member 14 is a permutation lock cylinder 25. Contained within the lock cylinder 25 is a rotating barrel 26, the outer end of which has the usual key slot not shown and its inwardly projecting end having secured thereto a rock shaft 27 as shown in Figures 1, 3 and 4. As stated, this rock shaft 27 has connection at one end with the rotating barrel 26 of the lock cylinder and at the other end is pivoted to the valve casing as at 28.

Above the rock shaft 27 and connected thereto by connecting rods 29 are stop or lock plates 30 and 31 pivoted to the valve casing as at 32. The lock plates 30 and 31, owing to the fact that their edges contact, have their upper faces held in a substantially horizontal plane and are prevented from moving downwardly even though pressure is exerted from above. The lock plate 31 carries a projection 33 which is adapted to contact with a pivoted spring pressed lever or latch 34 when the stop or lock plates are moved upwardly. This spring pressed lever or latch 34 primarily engages with internal ratchet teeth 35 carried by the internally screw threaded valve casing cover 36 through the opening 37 in the casing, to lock the cover against movement.

Mounted to reciprocate and rotate through the opening 38 in the cover, is a valve operating mechanism 39 having mounted on its lower end a detachable socket 40 and on its upper end a handle 41. A jam nut 42 frictionally engages the valve operating mechanism 39 and retains the same in predetermined positions.

A cap 43 connected to the valve casing by a chain or other means has screw threaded engagement with a nipple 44 on the valve casing to prevent sediment and water from entering the permutation lock cylinder 25.

The operation of the device is as follows:

The valve operating mechanism 39 is pulled upwardly until the socket 40 engages with the cover 36 or until it is out of the path of travel of the lock plates 30 and 31. A suitable key is then inserted in the lock barrel 26 and turned, causing the rock shaft 27 through the medium of connecting rods 29 to raise the lock plates 30 and 31 which swing upwardly in an arcuate path. This operation allows the valve operating mechanism 39 free downward movement to engage with the head 17 of the valve stem 15 to open or close the valve 16. To lock the valve against unauthorized use, raise the valve operating mechanism 39 until it is removed from the path of the lock plates 30 and 31 which are moved downwardly through the medium of rock shaft 27 and connecting rods 29 until the upper faces of the lock plates are on a horizontal plane.

It is understood that the form of my invention herewith shown and described is to be taken as a preferred example of the same, and that various changes in the shape, size and arrangement of parts may be resorted to without departing from the spirit of my invention or the scope of the subjoined claims.

Having described my invention, I claim:

1. A lock valve comprising a casing, a valve within said casing, detachable valve operating means, and lock means adapted to be interposed between said valve and valve operating means to prevent engagement of said operating means with the valve.

2. A locking valve comprising a casing, a valve within said casing, a detachable partition member supporting said valve, valve operating means above said detachable partition member, and means adapted to be interposed between said valve and valve operating means for preventing the operation of said valve.

3. A locking valve comprising a casing, a valve within said casing, a detachable partition member supporting said valve, detachable valve operating means, movable stop plates adapted to be interposed between said valve and said detachable valve operating means, and means for moving said stop plates out of the path of the detachable valve operating means.

4. A locking valve comprising a casing, a cover for the casing, securing means for said cover, a valve within said casing, movable lock plates for said valve and means carried by one of said lock plates to operate said cover securing means to release the same from the cover when the lock plates are moved to valve unlocking position.

5. A locking valve comprising a casing, a valve within said casing, detachable valve operating means, pivoted stop plates adapted to be interposed between the valve and said detachable valve operating means, and a rock shaft to move said pivoted stop plates out of the path of the detachable valve operating means.

6. A locking valve comprising a casing, a valve within said casing, shiftable valve operating means, movable stop plates adapted to be interposed between the valve and said shiftable valve operating means, and a rock shaft having connection with the movable stop plates to shift the same to and from their position between the valve and valve operating means.

7. A locking valve comprising a casing, a cover for the casing, latch means for said cover, a valve within said casing, a detachable partition member supporting said valve, detachable valve operating means carried by said cover, pivoted stop plates adapted to be interposed between said valve and said detachable valve operating means, means carried by one of said pivoted stop plates to operate the latch means for the cover when said stop plates are shifted to their position between the valve and valve operating means; and a rock shaft having connection with said pivoted stop plates to shift the same to and from their position between the valve and valve operating means.

In testimony whereof, I have affixed my signature in the presence of two witnesses.

VIRGIL J. HENDRICKS.

Witnesses:
W. C. NELSON,
O. C. HENDRICKS.